US010142302B2

(12) United States Patent
Maxwell

(10) Patent No.: US 10,142,302 B2
(45) Date of Patent: Nov. 27, 2018

(54) SYSTEMS AND METHODS FOR MANAGING RESETTING OF USER ONLINE IDENTITIES OR ACCOUNTS

(71) Applicant: Oath Inc., Dulles, VA (US)

(72) Inventor: Lachlan A. Maxwell, Ashburn, VA (US)

(73) Assignee: Oath Inc., Dulles, VA (US)

( * ) Notice: Subject to any disclaimer, the term of this patent is extended or adjusted under 35 U.S.C. 154(b) by 0 days.

(21) Appl. No.: 15/169,234

(22) Filed: May 31, 2016

(65) Prior Publication Data

US 2016/0277371 A1    Sep. 22, 2016

Related U.S. Application Data

(63) Continuation of application No. 14/013,972, filed on Aug. 29, 2013, now Pat. No. 9,386,011.

(51) Int. Cl.
*H04L 29/06* (2006.01)
*G06F 21/44* (2013.01)
*G06F 21/31* (2013.01)
*G06F 21/00* (2013.01)
*G06F 21/45* (2013.01)
(Continued)

(52) U.S. Cl.
CPC .............. *H04L 63/06* (2013.01); *G06F 21/45* (2013.01); *H04L 51/28* (2013.01); *H04L 61/2007* (2013.01); *H04L 63/083* (2013.01); *H04L 63/0876* (2013.01); *H04L 63/14* (2013.01); *H04L 67/306* (2013.01); *G06F 2221/2131* (2013.01)

(58) Field of Classification Search
CPC . H04L 9/32; H04L 29/06; H04L 63/08; H04L 63/10; G06F 21/00; G06F 21/31; G06F 21/44

USPC .......................................... 726/4, 17, 21, 28
See application file for complete search history.

(56) References Cited

U.S. PATENT DOCUMENTS 8,555,357 B1 * 10/2013 Gauvin ................. G06F 21/577
                                                        380/286
8,601,547 B1 * 12/2013 Shen ..................... G06F 21/554
                                                        713/161

(Continued)

OTHER PUBLICATIONS

International Search Report and Written Opinion for corresponding International Application No. PCT/US2014/050058, dated Oct. 15, 2014, 8 pages.

(Continued)

*Primary Examiner* — Joseph P Hirl
*Assistant Examiner* — Kalish K Bell
(74) *Attorney, Agent, or Firm* — Bookoff McAndrews, PLLC

(57) ABSTRACT

Systems and methods are disclosed for managing the resetting of online identities or accounts of users of Internet web pages. One method includes: receiving, through an electronic device, a request to reset login information to access a web page associated with the user's online account; determining that an IP address associated with the request is not identified as being suspicious; receiving user data intrinsic to the user's request; automatically verifying two or more values of the data intrinsic to the user's request as being indicative of a level of trust of the identity of the user; and transmitting, to the user over the Internet, a subset of options to reset the login information, the subset being selected based on the level of trust.

20 Claims, 6 Drawing Sheets

(51) Int. Cl.
*H04L 12/58* (2006.01)
*H04L 29/12* (2006.01)
*H04L 29/08* (2006.01)

(56) References Cited

U.S. PATENT DOCUMENTS

| | | |
|---|---|---|
| 9,386,011 B2 * | 7/2016 | Maxwell ............... H04L 63/083 |
| 2007/0118887 A1 | 5/2007 | Roskind |
| 2011/0047608 A1 | 2/2011 | Levenberg |
| 2013/0047227 A1 | 2/2013 | Schultz et al. |
| 2013/0212654 A1 | 8/2013 | Dorfman et al. |
| 2014/0380422 A1 * | 12/2014 | Su ....................... H04L 63/1433 |
| | | 726/4 |
| 2015/0089376 A1 * | 3/2015 | Slapp, III ................ G09B 7/00 |
| | | 715/738 |

OTHER PUBLICATIONS

International Preliminary Report on Patentability issued in corresponding International Application No. PCT/US2014/050058, dated Mar. 10, 2016.

* cited by examiner

SYSTEMS AND METHODS FOR MANAGING RESETTING OF USER ONLINE IDENTITIES OR ACCOUNTS

CROSS-REFERENCE TO RELATED APPLICATIONS

This application is a continuation of pending U.S. application Ser. No. 14/013,972, filed on Aug. 29, 2013, which is incorporated herein by reference in its entirety.

TECHNICAL FIELD

Various embodiments of the present disclosure relate generally to managing online identities of users of Internet web pages. More specifically, exemplary embodiments of the present disclosure relate to systems and methods for managing the resetting of online identities or accounts of users of Internet web pages, based on data intrinsic to the users' interaction with Internet web pages.

BACKGROUND

Online identity and password management has concerned online users and online companies since the advent of the Internet. Users often find it difficult to remember and keep track of different credentials or logins (e.g., usernames and/or passwords) for their various online accounts and may either forget this login information or provide incorrect login information. As a result, many users use the same password for many different websites or have to reset their login information. This has led to an increase in unauthorized users and/or entities attempting to access user accounts by attempting to reset user login information.

For example, the use of passwords and existing account reset techniques has been abused by malicious entities seeking to gain unauthorized access to users' accounts in order to perform various malicious tasks. For example, the malicious entities may exploit an online service provider's willingness to reset an account or password in order to gain access to a user's account for the purpose of obtaining contact lists, active e-mail addresses, personal information, etc. Alternatively or additionally, malicious entities may exploit an online service provider's willingness to reset an account or password in order to obtain access to the user's e-mail account in order to send e-mails, such as SPAM, phishing scams or requests, or other types of fraudulent, abusive, and/or burdensome messages.

One attempt to mitigate the disadvantages of traditional passwords involves the use of so-called "two-step verification," which leverages the use of some physical key carried by a user. For example, many known methods involve the use of a pocket-sized authentication token which is carried by the user and displays a changing passcode on an LCD or e-ink display, which must be typed in at an authentication screen. The number is typically derived from a shared secret by a cryptographic process that makes it infeasible to work out the secret from the sequence of numbers, e.g., using a hash or other cryptography combined with a challenge. The same process repeated on the authentication server will yield the same result if the correct secret was used. Another technique for two-step authentication involves receiving a username and password from a user, and then sending, e.g., by SMS, a unique code to the user through a linked device, such as a mobile phone. The user receives the unique code at the mobile phone, and types it into the website to prove that the user has possession of the device, and is therefore likely the user associated with the previously input credentials.

Unfortunately, many people have not yet implemented two-step verification or other password improvements to their online accounts. This is especially true of people who opened online accounts a relatively long time ago, such as 5-10 years ago, or before certain other password or user verification techniques were implemented. To thwart this vulnerability, many online websites have increased the requirements associated with resetting accounts or passwords, by requiring all users attempting to reset login information to either submit substantial additional user data or call the online company and speak to a representative to attempt to prove their identity to gain access to their online account. However, these methods make it more difficult for even legitimate users to reset and access their accounts and it does not differentiate between users of different levels of trustworthiness. For many people, an online company would have to resort to the undesirable options of either allowing each user to reset a password with minimal verification that they are whom they say they are, or have to prevent the user from resetting a password, and instead insist on the undesirable workaround that the user abandon that account and open a new account.

Accordingly, a need exists for systems and methods for managing the resetting of online identities or accounts of users of Internet web pages, based on data intrinsic to the users' interaction with Internet web pages.

SUMMARY OF THE DISCLOSURE

According to certain embodiments, systems and methods are disclosed for managing the resetting of online identities or accounts of users of Internet web pages. One method includes: receiving, through an electronic device, a request to reset login information to access a web page associated with the user's online account; determining that an IP address associated with the request is not identified as being suspicious; receiving user data intrinsic to the user's request; automatically verifying two or more values of the data intrinsic to the user's request as being indicative of a level of trust of the identity of the user; and transmitting, to the user over the Internet, a subset of options to reset the login information, the subset being selected based on the level of trust.

According to certain embodiments, methods are disclosed for authenticating an identity of an online user. One method includes receiving, through an electronic device, a request to reset login information to access a web page associated with the user's online account; determining that the online address of the electronic device is trusted; receiving user data intrinsic to the user's request; verifying a trusted pair of the data intrinsic to the user's request; authenticating the identity of the user; and transmitting to the user options to reset the login information.

The method may include any one of or a combination of the following steps and/or features: the login information may be least one of the user's user identifier or password, the step of determining that the online address of the electronic device is trusted may include comparing the online address to a database of known aberrant online addresses, the step of determining that the online address of the electronic device is trusted may further include determining if other reset requests have been received from the online address within a preset amount of time, the data intrinsic to the user's request may be selected from the group consisting of: IP address, username, time of the request, frequency of the request, browser type, age of account, cookies, and device finger print, the step of verifying a trusted pair of the data intrinsic to the user's request may include any pair of the group consisting of time of the request, frequency of the request, browser type, age of account, cookies, and device finger print.

According to certain embodiments, systems are disclosed for authenticating an identity of an online user. One system includes a data storage device storing instructions for authenticating an identity of an online user; and a processor configured to execute the instructions to perform a method including: receiving, through an electronic device, a request to reset login information to access a web page associated with the user's online account; determining that the online address of the electronic device is trusted; receiving user data intrinsic to the user's request; verifying a trusted pair of the data intrinsic to the user's request; authenticating the identity of the user; and transmitting to the user options to reset the login information.

According to certain embodiments, a computer-readable medium is disclosed that, when executed by a computer system, causes the computer system to perform a method for authenticating an identity of an online user, the method including: receiving, through an electronic device, a request to reset login information to access a web page associated with the user's online account; determining that the online address of the electronic device is trusted; receiving user data intrinsic to the user's request; verifying a trusted pair of the data intrinsic to the user's request; authenticating the identity of the user; and transmitting to the user options to reset the login information.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes method and systems of using data intrinsic to a user's interaction with a web page to validate the user's identity. Specifically, the present disclosure describes methods and systems for using data intrinsic to a user's interaction with a web page to control how a user may reset his or her online login information and access an online account. As described above, each time an online service provider receives a request to reset an account or password associated with a particular username, there is some likelihood that the request was generated by the person associated with the username, but there is also some likelihood that the request was generated by a malicious entity, whether a person, company, or machine (e.g., a server or "bot"). The present disclosure is directed to evaluating, over time, activity and information obtained from a user's or device's interaction with one or more servers of the online service provider, to determine trustworthiness levels associated with the interaction, and to accordingly modify the options available for resetting the respective account and/or password. Embodiments of the present disclosure will now be described with respect to FIGS. 1-6.

Figure 1:
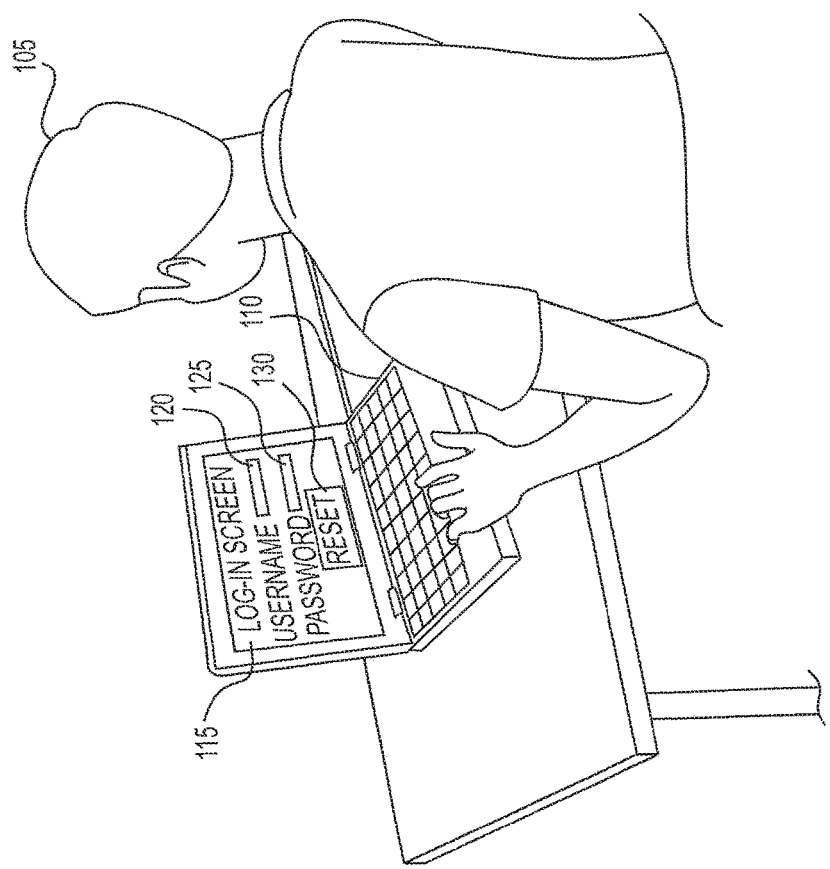
FIG. 1 is an illustration of a user attempting to reset login information through a web page, according to an exemplary embodiment of the present disclosure.

FIG. 1 is an illustration of an exemplary environment 100 in which a user may be attempting to reset a username and password through a web page 115 using an electronic device 110, according to an exemplary embodiment of the present disclosure. As shown in FIG. 1, a user 105 may visit the website or web page 115, which requires a user to gain access to an online account by logging in by electronically, and submitting unique login information previously generated by the provider of the online account or previously created and submitted by the user. The login information may include any unique identifier (e.g. a username, email address, account number, etc.) and a password and/or pin. For example, as shown in FIG. 1, the login screen of the web page 115 may include prompts for the user to submit a username 120 and password 125, and also may include a user element or link 130 enabling the user to request to reset the username and/or password by having his or her identity validated or authenticated, before gaining access.

Examples of types of user online accounts may include online portals, e-mail services, e-commerce sites, banking sites, financial sites, document management sites, electronic research sites, content sites, or any other website involving a user logging-in. The electronic device 110 may be any device connected to the Internet or any other network that may enable communication of data between the device 110 and a server of the online account. For example, the electronic device 110 may be a user's personal computer (PC), whether desktop or laptop, a tablet device, a mobile device, a home- or vehicle-installed computer, or any other type of computing device. Moreover, in certain embodiments, the electronic device 110 may be a server or any other type of automated computing machine implemented by a malicious entity, such as a spammer or hacker.

The username 120 may be any unique string of characters provided by the user to the online account server and approved by the online account during initial setup of the online account, or may be automatically created by the online account and provided to the user. The online account may verify that the username 120 is unique to the user such that no other user has the same username 120. For example, if during initial setup of the online account, the user selects a username that is already being used by a current user of the online account, the online account may prompt the user to select a different username, or may provide suggestions of available unique usernames. In addition, the password 125 may be any string of characters provided by the user to the online account and approved by the online account either during initial setup of the online account or at any time after the initial online account setup. The online account may provide password requirements to the user to ensure that the password is secure. For example, the online account may require that a password be at least eight characters in length and include a symbol, a number, and a letter.

The reset user element or link 130 may be any selectable icon on the online account web page 115 that the user may select in order to request to reset the user's username 120 and/or password 125. The reset user element or link 130 may appear on the web page 115 having the prompts for and/or forms into which a user may enter the requested/required username 120 and password 125, or the reset user element or link 130 may be provided on a different but related web page. The reset user element or link 130 may be automatically, electronically displayed by the online account at any time during the user's attempt to login. For example, the reset user element or link 130 may only be displayed after the failed attempt to login, such as after the user provides an incorrect username 120 and/or password 125. Alternatively, the user may request a reset without any attempt of providing login and/or password information. For example, if the user does not remember either of the username and/or password, the user may request to reset his or her username and/or password without even attempting to enter those credentials.

Figure 2:
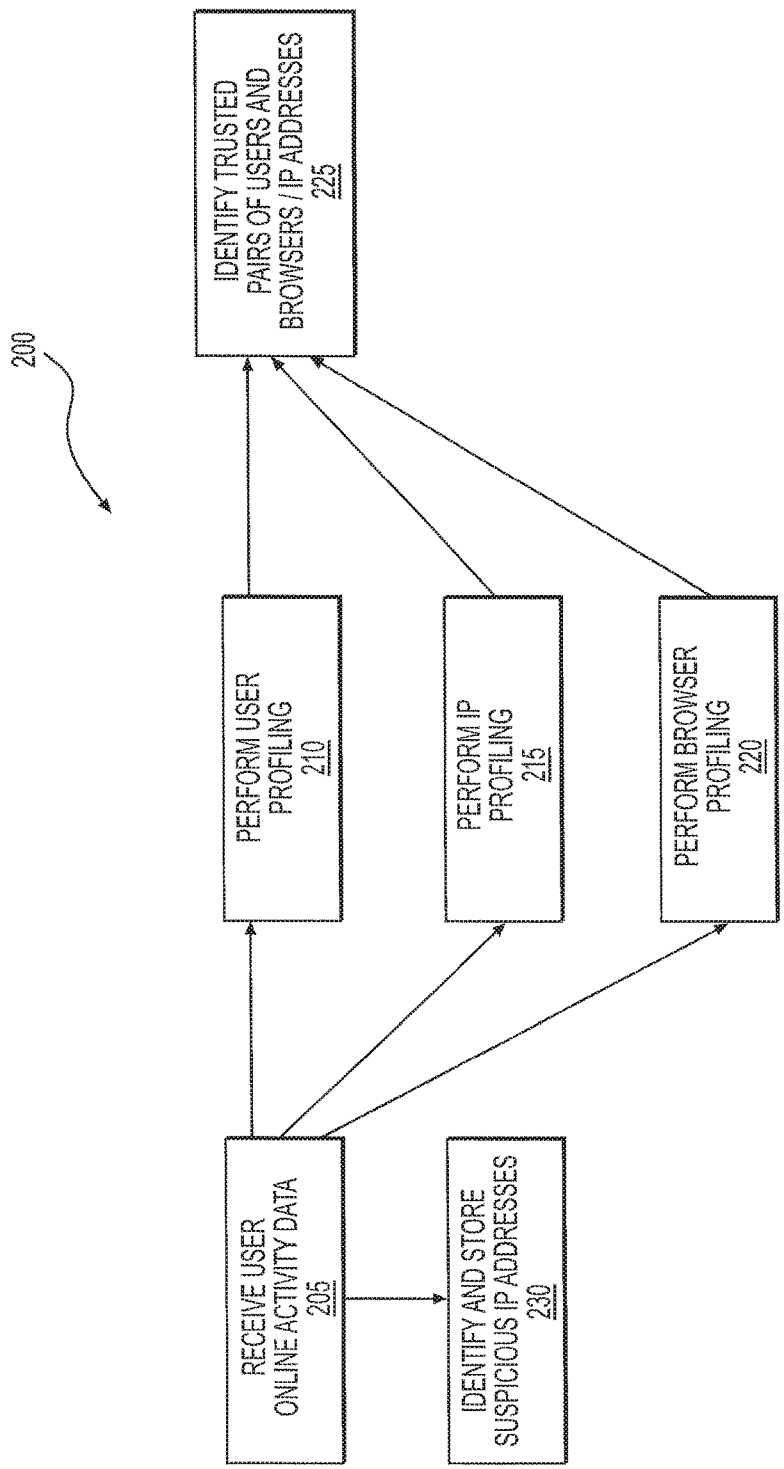
FIG. 2 is a flow diagram of methods for receiving user online data and authenticating the identity of the user, according to exemplary embodiments of the present disclosure.

FIG. 2 shows a flow diagram 200 of methods of electronically receiving and evaluating user online information for use in authenticating the identity of the user, and in managing the user's password/account reset options. The method 200 may be implemented prior to the user submitting any login information or requesting a password or account reset. The method 200 may be implemented any time the user navigates to the online account web page or a web page associated with the online account web page, and may be used to receive data that may later be used in evaluating reset options, for example, via a method 300 shown in FIG. 3. In other words, if a provider of the user's username and password is an e-mail provider that maintains other websites, and/or that tracks a user's web browsing activity (e.g., using a toolbar or third party cookies), that provider may monitor a user's activity and login credentials even before a user requests to reset a password or other login credentials. As a result, the provider may receive or otherwise generate and store information that can be evaluated and analyzed to determine whether and how to reset a user's password, if and when the user requests to reset the password.

In one embodiment, method 200 may include electronically receiving, e.g., over the Internet or other network, a user's online activity data (step 205), such as upon the user's online navigation to or interaction with an online account web page. As described above, the online data may be received upon the user's navigation to or interaction with the online account web page (e.g., where the user normally logs-in using username and password entries), or upon the user's navigation to or interaction with any another web page that the provider can track using a toolbar, cookies, pixel tags, or any other known means. The user's online activity data may include one or more of: an IP address, device information, browsing history (URLs, domains, etc.), click history, user identity, screenname logins, etc. Method 200 may then include performing one or more of user profiling (step 210), IP address profiling (step 215), and browser profiling (step 220). The profiling steps 210, 215, and 220 may be accomplished by electronically processing the online user data received at step 205 and electronically, automatically comparing the data, including the user's identifying information, IP address, and browser to databases of authenticated user information, and known aberrant user data.

The method also may include a step 230 of identifying the IP address received as part of the user online activity data at step 205 and comparing the IP address with a database of known suspicious IP addresses. For example, the IP address of the electronic device used to make the request may be compared to database(s) of IP addresses known to belong to one or more aberrant or malicious entities. The database may be saved in memory of the service provider's server or may be saved in memory on a different server accessible by the server via the network. The database may include IP addresses and aberrant or malicious entities associated with the IP addresses. As described above, an aberrant or malicious entity may be any entity, such as known spammers or hackers, that is not the user and that may have attempted to access other user accounts. In one example, a suspicious IP address may be identified by retrieving the number of unassociated screen names for which a reset procedures was initiated from an IP address within a predetermined length of time (e.g. 1 hour, 2 hours, 4 hours, 8 hours, etc.) Furthermore, according to this example, the following factors may be evaluated: the number of unassociated screen names identified and considered fraudulent based on prior activity, the number of screen names that were in a compromised state and from which a reset attempt would be expected, and/or the number of active users such that there would be any likelihood that a legitimate reset may be requested. In another example, the number of unassociated screen names failing passwords at login from a particular IP address may be tracked. According to this example, this may be determined by the number of names considered fraudulent based on prior activity, the number of names in a compromised state such that there would be an expectation for a reset request, and the number of active users such that there may be a likelihood that a legitimate reset request may be made. In addition, the IP address may be compared to IP addresses from which attempted transmissions of spam and/or fraudulent registrations were sent.

In one embodiment, method 200 may include performing user profiling (step 210) by comparing a user, e.g., through a user ID to information known about various users, and determining whether or not to provide the user with password reset options, such as based on whether the user is determined to be a malicious user, such as a spammer. For example, if the user or an ID associated with the user has been involved in past interactions determined to be associated with hacking, spamming, using abusive browser footprints, or otherwise involved in unauthorized access, then method 200 may include profiling the user as an untrusted user.

Method 200 may include performing IP address profiling (step 215), such as by identifying IP addresses that have been associated with a number of users over a threshold number of users, or IP addresses that have been associated with the use of an abusive browser footprint. In other words, step 215 of method 200 may operate on assumptions that IP addresses associated with only, for example, up to 8 or 10 electronic devices, device IDs, or unique user IDs, is unlikely to be used by a spammer, whereas IP addresses associated with tens or even hundreds of electronic devices, device IDs, or unique user IDs is likely to be used by a spammer. Thus, the server may determine whether an IP address is likely associated with a public portal or unsecure network connection in any suitable manner. For example, the server may calculate the number of different devices attempting to access any of the server's web pages from the same IP address within a pre-determined time period and, if the number is above a predetermined threshold, then it may be determined that the IP address is a public portal, and the IP address may be saved in a database of known public portals. The IP address may also, or alternatively, be examined to determine if the IP address is regularly used by the user, and/or if it is associated with a public portal or unsecure network connection, and if so, may determine that the IP address is suspicious.

Method 200 may include performing browser profiling (step 220) by determining whether the person is using a browser that appears to have an abusive browser fingerprint. For example, if a reset request is received in relation to a standard browser associated with a single device or IP address, the browser may be flagged as likely associated with a trusted user. However, if a reset request is received in relation to what appears to be a bot, a spoofed desktop session, a foreign-originated browser, a cloud-based browsing session, or any other suspicious activity, then the browser may be flagged as likely associated with an untrusted user.

The method 200 may subsequently include a step of automatically, electronically identifying trusted pairs of users and browsers and/or IP addresses (step 225). Step 225 of method 200 may include identifying two or more verified data values related to a user's identity, browser, and/or IP address. For example, if the electronic processing of the profiling steps (210, 215 and 220) results in verifying the user's IP address as an IP address that the user has successfully logged in from in the past and the browser is the same as the browser that the user has previously used, and has cookies with user identifying information (e.g., user mailing address or email address), then these verified user data values may be identified as trusted pairs at step 225. Of course, as will be described in more detail below with respect to FIG. 3, any combination of verified data values may be combined and evaluated to place users into any desired category of trustworthiness. For example, different user, IP address, and browser characteristics may carry different weights toward or against characterization as being part of a trusted or untrusted pair. In another example, a user may be associated with a generally established geographic region from which he/she may consistently or often authenticate. Within that geographic region, the method may determine a /24 area of IPv4 space (i.e., a 24 bit space) that the user has used during a predetermined period of time (e.g., 5 days out of 60 days). If none of the uses of that /24 space were deemed suspicious, (e.g., that /24 space was not used by more than 7 other users in the last 60 days), then the user may be deemed trustworthy. In another example, a user may be associated with a generally established geographic region from which he/she may consistently authenticate. Within that geographic region, a device fingerprint may be determined which the user may have used for a predetermined period of time (e.g., 5 days out of the last 60 days), and if none of the uses of that device fingerprint were deemed suspicious (e.g., the device fingerprint was not used by more than 7 users in the last 60 days), then the user may be deemed trustworthy.

Figure 3:
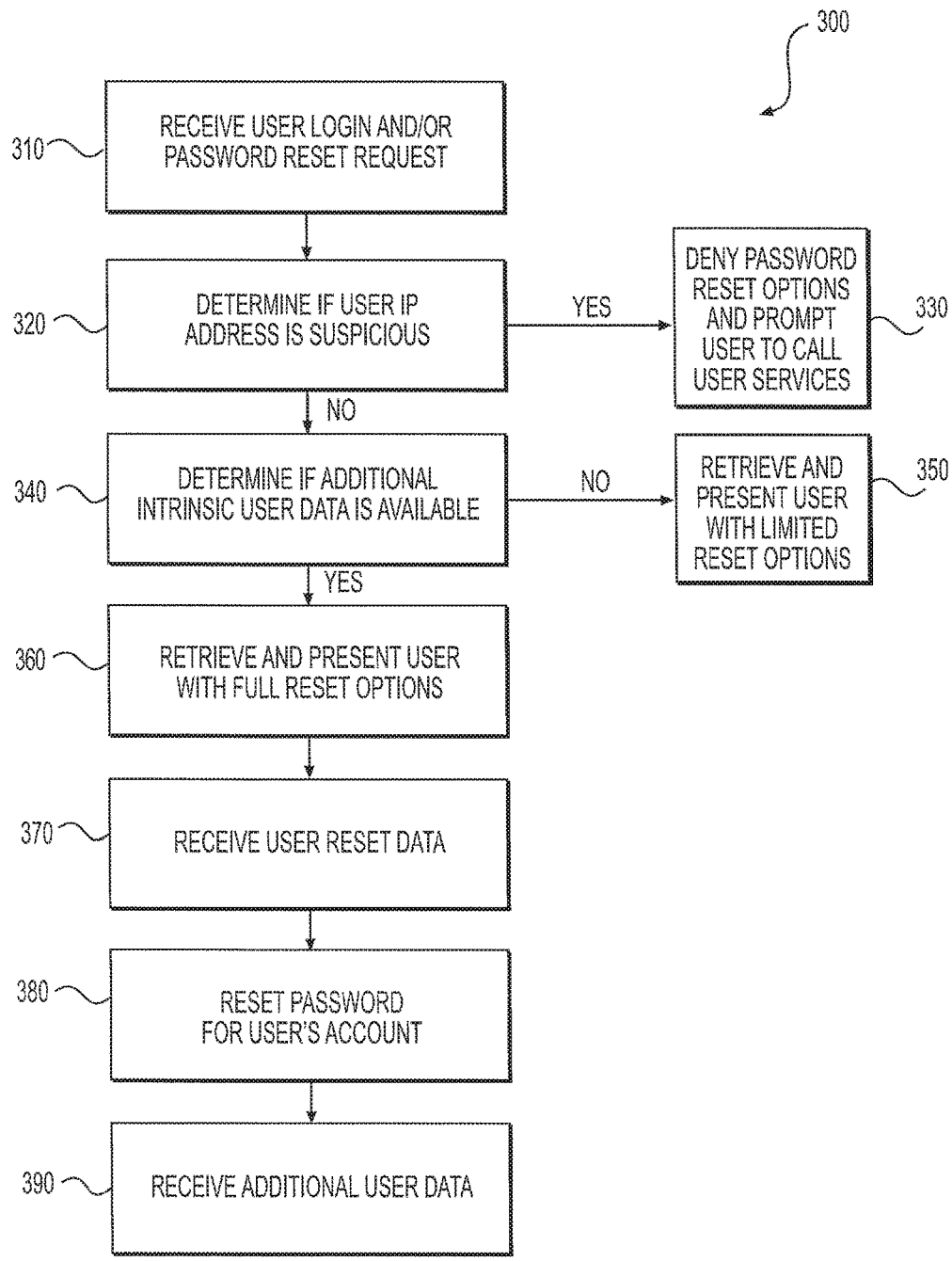
FIG. 3 is a flow diagram of methods for resetting users' online login information using data intrinsic to a user interaction with a web page, according to exemplary embodiments of the present disclosure.

FIG. 3 is a flow diagram of an exemplary method 300 for validating a user's identity using data intrinsic to a user's interaction with a web page and providing (i) no reset options, (ii) limited reset options, or (iii) full reset options, according to an exemplary embodiment of the present disclosure. In one embodiment, method 300 may involve receiving, from a user, via an electronic device, a request to reset account login information (e.g., name and/or password) (step 310). The request may be sent via a network, such as the Internet and received by a server, such as an online account server or any other server described with respect to FIG. 4. The server may automatically electronically process the request, using a processor, by retrieving intrinsic user information in the request. Such intrinsic user information may include any information regarding the IP address of the user, any cookies, browser information, browser history, open and active accounts on the same electronic device, any information about the electronic device, any recent or past login attempt information, any concurrent login sessions on other devices, etc.

For example, the server may retrieve information regarding the IP address of the electronic device used to make the request, and at step 320, the server may determine whether the IP address was previously determined to be suspicious. As described above with respect to FIG. 2, the server may determine that an IP address is suspicious based on any algorithm, formula, comparison to a database of known aberrant IP addresses or any other suitable method.

If it is determined, at step 320, that the IP address is suspicious, the user may be prompted to call a representative of the online account provider (step 330), or to otherwise verify the identity of the user in a manner that is not over a network (e.g. in person or over the telephone). For example, the server may display on the account web page a toll-free number or other phone number and prompt the user to call that number. In one embodiment, the server may prompt the user to call that number from the phone number with which the user registered the online account. When the user calls the displayed phone number, the user may be questioned or tested to determine whether the user has provided enough personal or identifying information to achieve a predetermined confidence level that the person is who they say they are.

If it is determined at step 320 that the user IP address is not suspicious (step 320, "NO"), then the server may automatically and electronically determine whether additional intrinsic user data is available (step 340). Additional intrinsic user data may include any data that may verify or increase the probability that the reset request is from the user and not another entity. For example, additional intrinsic user data may be obtained by retrieving user information previously obtained at a time when the user successfully accessed the online account and/or navigated to the online account web page, as shown in FIG. 2. If additional user intrinsic information is either unavailable or is not verified (step 340, NO), then the server may retrieve and present the user with limited reset options (step 350). In one embodiment, the limited reset options may include reset mechanisms that involve a user's access to a physical device, such as a cell phone, or to another account or number associated with the account before initiation of the password reset sequence. For example, in one embodiment, the user may be provided with the limited options to reset a password by receiving a code at a mobile phone linked to the account, receiving a code at an e-mail address associated with another account, and/or entering a credit card associated with the account.

In one embodiment, the limited reset options provided at step 350 may require the input of any combination of secondary unique user information that is not intrinsic and not automatically retrievable from the user's online interaction with the online account web page and/or reset via external verification of the user's identity. Such limited reset options may require a higher level of verification and may require more than one verification step from the user. Examples of such secondary unique information may include the user's credit card information. Examples of external verification of the user's identity may include login information sent to a previously submitted email address, an SMS verification code sent to a previously submitted mobile number, or any other reset option having a high level of security.

If, at step 340, it is determined that additional matching intrinsic data is available, then method 300 may further include evaluating the available intrinsic data for matching pairs indicative of valid use, to determine which of the full reset options to present to a user. In one embodiment, the server may automatically compare past login information of a user with the reset request in order to verify the identity of the user and determine that the user should receive a full list of reset options, e.g., if two or more values of intrinsic user data are verified and match. Examples of such additional user data may include: the time the request is made, the frequency with which the user previously accesses the account, the similarity of any incorrect login information recently provided, the profile of the user, the type or browser used to make the request whether or not a mobile device (e.g. mobile application) is already logged into the account, whether or not a screen name for an associated accounted is active or recently active, the age of the account, whether there is a threshold amount of history for a user to indicate likely login location(s), the duration of the login attempt, active related screen names, saved cookies, the device fingerprint, and/or any other suitable data.

The server may determine that two or more verified additional intrinsic user data values may result in a full set of reset options for the user to choose from to reset the user account (step 360). The user may then input, using the electronic device, account login reset data (step 370) and the server may receive the reset data via the network and process the data update the user account an reset the account (step 380). The method may also include a step of receiving additional user data from the user (step 380), which may be later used by the server to automatically verify the user's identity.

The full range of reset options may include the limited reset options as well as options having a lower level of security. For example, input of an answer to a secret question, the answer to which was previously submitted, etc., and/or directly allowing the user to reset username and password.

Figure 4:
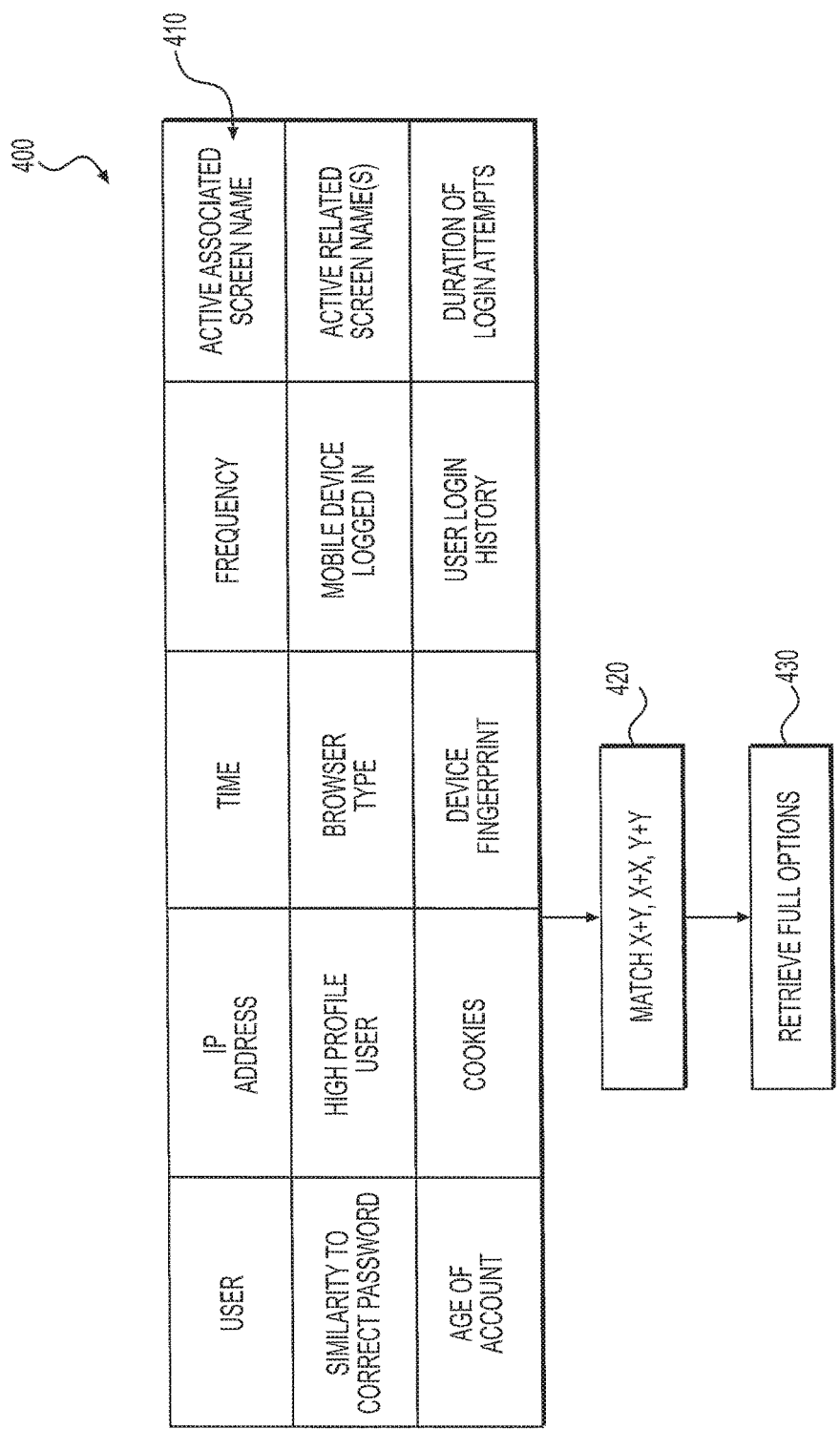
FIG. 4 is a schematic diagram of sources of additional data intrinsic to a user interaction with a web page, for evaluating user identities and retrieving limited or full password reset options, according to exemplary embodiments of the present disclosure.

FIG. 4 shows a schematic diagram 400 of sources of additional intrinsic user data, and methods of evaluating whether a pair or more of verifiable additional intrinsic data points is available. As shown in FIG. 4, examples of intrinsic user data 410 may include the time the request is made, the frequency with which the user previously accesses the account, the similarity of any incorrect login information recently provided, the profile of the user, the type of browser used to make the request, whether or not a mobile device (e.g. mobile application) is already logged into the account, whether or not a screen name for an associated accounted is active or recently active, the age of the account, whether there is a threshold amount of history for a user to indicate likely login location(s), the duration of the login attempt, active related screen names, saved cookies, the device fingerprint, and/or any other suitable data. For example, if the user has previously logged into the account from the IP addresses on a certain number of distinct days, then the user and IP address may be defined as a trusted pair of user intrinsic data.

The online account server may automatically, electronically retrieve past login data for the user and compare such data to the reset request. The online account server may compare the time of the reset request with any pattern of user login times, if available. For example, if the online account server determines, based on an analysis of the user's past login history, that the user usually logs into the online account on certain days and/or a within certain time range (e.g., Monday-Friday 9 a.m. to 4 p.m.) and the reset request is received at a time outside the range (e.g., Sunday at 3 a.m.), the server may determine that the user identity cannot be verified based on time. In another example, if the user has not logged in for a certain threshold time (e.g., the user is an infrequent user or has not logged in within some predetermined period of time), then the server may determine the user cannot be verified based on frequency.

The server may retrieve any saved user data on past incorrect login information inputted by the user, and compare and analyze it with any incorrect login information immediately preceding the reset request, to determine if the user may be providing login information that is the same as any incorrect login information recently provided. For example, if a user uses a first login and/or password for a different account and has in the past attempted to access the present account using that first login and/or password, then the server may conclude the authenticity of another occurrence of the user inputting the first login and/or password immediately prior to requesting reset of the account. The authenticity of another or prior login may be stored as a verified additional intrinsic user data value.

The server may also analyze the profile of the user to determine the likelihood that an entity other than the actual user may have requested a password/account reset. For example, if the user is a well-known person (e.g., a celebrity or politician), or any other entity likely to be targeted by malicious or aberrant entities, then the server may perform a higher level of scrutiny or evaluation of user identity/authenticity. The server may also analyze the type of browser used to make the reset request to determine if the user has used the same browser in the past or if the browser if a type known to be used to aberrant entities. The server also may automatically check if the user is already logged into the account using a mobile device (e.g., via a mobile application) and determine that if the user is already logged in using a mobile device, then the request attempt may not be verified. The age of the account may also be checked, and any cookies with information verifying the identity of the user also may be checked. In addition, any device fingerprints (e.g., device operating system, privacy settings, etc.) also may be used to verify the identity of the user.

Thus, the system may automatically, electronically determine if any screen name for an associated account is logged in from the same IP address and/or electronic device. For example, when a request is made to reset the login information of an online account, the system may automatically check to see if the user of the online account has any associated screen names, e.g., instant messaging screen names associated with the account, and if any associated screen names are logged on and active (e.g. not idle). If the system determines that an associated screen name is active from the same IP address and/or computer as the reset request, then the system may determine the reset request is partially validated. In another example, screen names of related users may also be used to verify an online account reset request. For example, when a request is made to reset the login information of an online account, the system may automatically check to see if the user of the online account has any related screen names, e.g., instant messaging screen names of related online accounts, and if any related screen names are logged on and active (e.g., not idle). If the system determines that a related screen name is active from the same IP address and/or computer as the reset request, then the system may determine the reset request is partially validated. The system also may automatically determine if the reset request is similar to any other historical login data for the user. For example, in addition to time, IP address, and/or computer finger print, the system may also determine other user historical data, such as which website the user navigates from prior to the reset request, etc. In addition, the system may automatically check the duration of the user's state, e.g., the duration of the reset request attempt.

Any two or more matches of the verified additional intrinsic user data may be used to verify the identity of the user and may constitute a trusted pair (step 420) and the user may be presented with all of the reset options at step 430.

Figure 5:
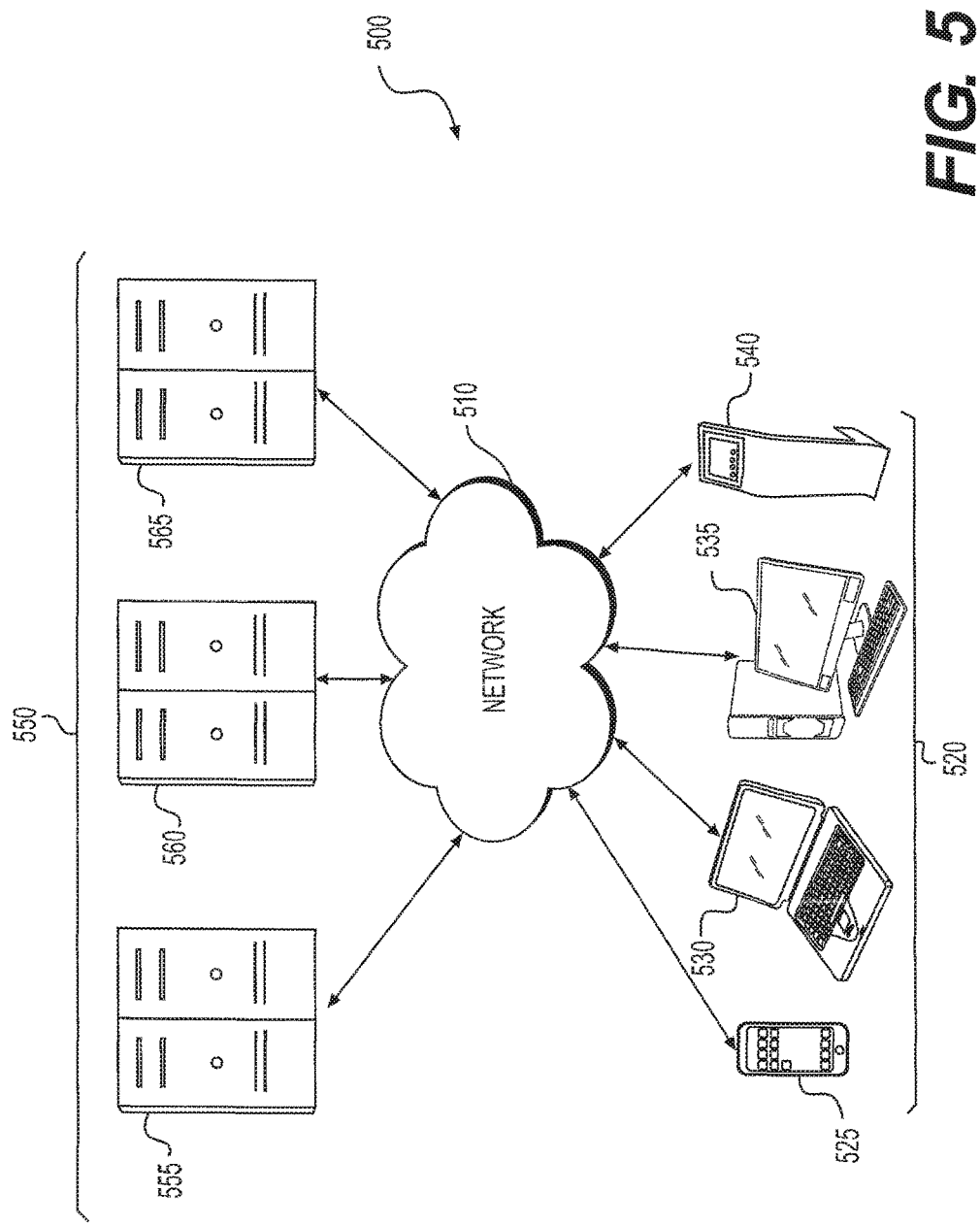
FIG. 5 is a block diagram of a communications system configured to retrieve and present users with limited or full reset options, according to exemplary embodiments of the present disclosure.

FIG. 5 is a block diagram of an environment and system for performing online authentication using imaging techniques, according to an exemplary embodiment of the present disclosure. Specifically, FIG. 5 illustrates an exemplary environment 500 including a plurality of user electronic devices 520, such as mobile device 525, computers 530, 535, and electronic kiosks 540. Each of the electronic device 520 and one or more servers 550, such as accounts server 555, transactions server 560, and external server 565 via an electronic network 510, may be in communication with each other via an electronic network 510, such as the Internet.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

Figure 6:
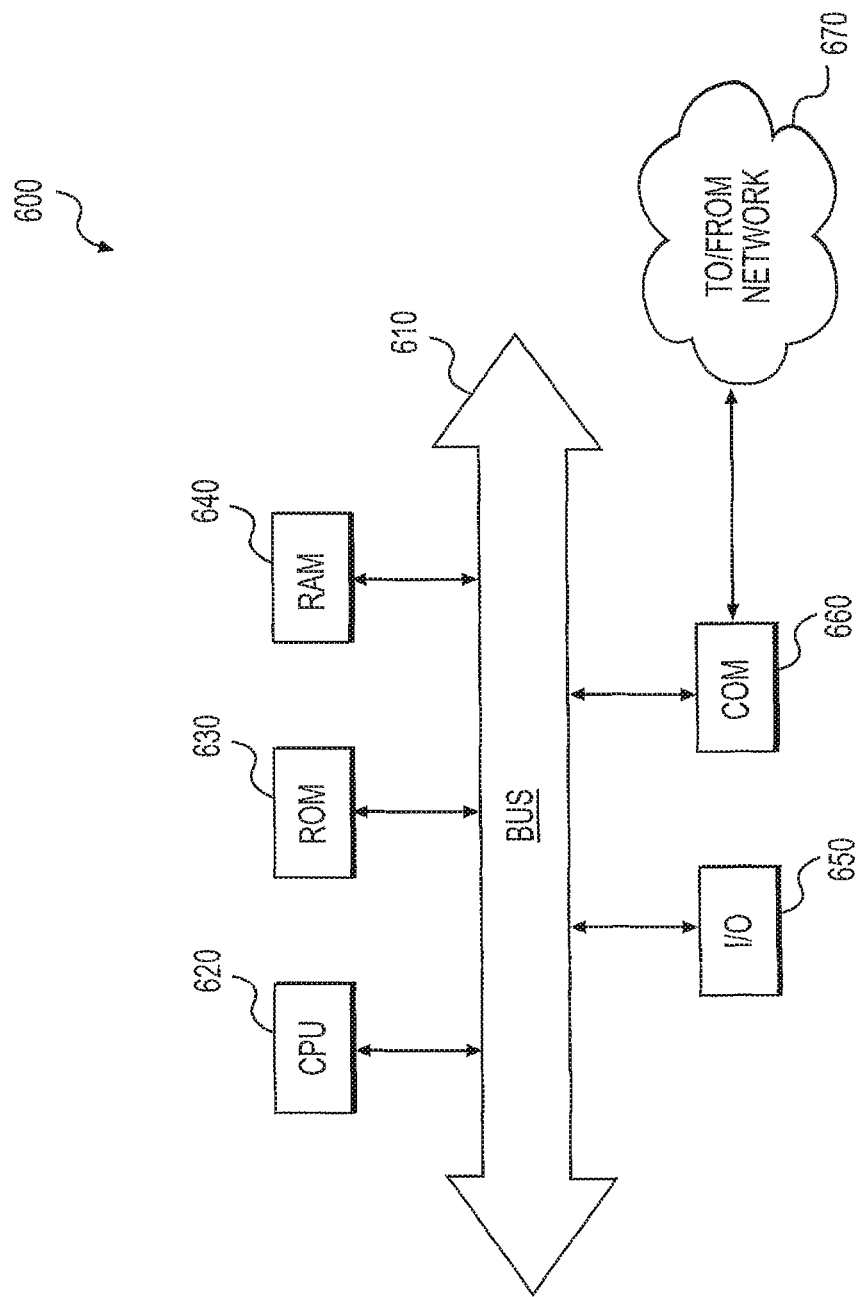
FIG. 6 is a simplified functional block diagram of a computer configured as a host server, for example, to function as a reset server, according to exemplary embodiments of the present disclosure.

FIG. 6 provides a functional block diagram illustration of general purpose computer hardware platforms. FIG. 6 illustrates a network or host computer platform 600, as may typically be used to implement a server, such as the accounts server 555, the transactions server 560, and/or the external server 565. It is believed that those skilled in the art are familiar with the structure, programming, and general operation of such computer equipment and as a result the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the server 600 often receives programming and data via network communications 670. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for managing resetting of user accounts, the method comprising:
receiving, over a network, a request to reset login information to access an online account of a user;
comparing, at an online account server, a time of the request to reset login information to a preset time or amount of time;
receiving, over the network, intrinsic user data associated with the request to reset login information, wherein the intrinsic user data includes a device finger print and a type of browser used to make the request, and wherein the intrinsic user data includes values with different weights indicative of a level of trust of the identity of the user;

identifying, at the online account server, two or more values of the intrinsic user data; and transmitting, over the network, a subset of options to reset the login information, wherein the subset of options to reset the login information is selected by the online account server based on the identified two or more values of the intrinsic user data, and wherein a full set of reset options are transmitted when the online account server determines that the identified two or more values result in a trusted pair.

2. The method of claim 1, further comprising:

determining whether one or more unauthenticated reset requests have been received from an IP address associated with the request; and determining whether the IP address associated with the request is not identified as being suspicious based on the step of determining whether one or more unauthenticated reset requests have been received from the IP address and the step of comparing the time the request to reset login information was received to the preset amount of time.

3. The method of claim 1, wherein the login information is at least one of a user identifier of the user or a password of the user.

4. The method of claim 2, wherein the step of determining that the IP address associated with the request is not identified as being suspicious further comprises comparing the IP address to a database of IP addresses known to be associated with malicious or aberrant entities.

5. The method of claim 1, further wherein the intrinsic user data of the request is one or more of an IP address, a username, the type of browser used to make the request, an age of the online account, and one or more cookies.

6. The method of claim 1, wherein the step of identifying two or more values of the intrinsic user data further comprises evaluating at least two of a time of the request, a frequency of the request, the type of browser used to make the request, an age of account, one or more cookies, and the device finger print.

7. The method of claim 1, wherein the step of identifying two or more values of the intrinsic user data comprises evaluating a presence or absence of data of a screen name or related screen name of the user.

8. A system for managing resetting of online identities or accounts of users, the system including:

a data storage device storing instructions for managing resetting of online identities or accounts of users; and a processor configured to execute the instructions to perform a method including:

receiving, over a network, a request to reset login information to access an online account of a user;

comparing, at an online account server, a time of the request to reset login information to a preset time or amount of time;

receiving, over the network, intrinsic user data associated with the request to reset login information, wherein the intrinsic user data includes a device finger print and a type of browser used to make the request, and wherein the intrinsic user data includes values with different weights indicative of a level of trust of the identity of the user;

identifying, at the online account server, two or more values of the intrinsic user data; and transmitting, over the network, a subset of options to reset the login information, wherein the subset of options to reset the login information is selected by the online account server based on the identified two or more values of the intrinsic user data, and wherein a full set of reset options are transmitted when the online account server determines that the identified two or more values result in a trusted pair.

9. The system of claim 8, wherein the processor is further configured to execute the instructions to perform the method including:

determining whether one or more unauthenticated reset requests have been received from an IP address associated with the request; and determining whether the IP address associated with the request is not identified as being suspicious based on the step of determining whether one or more unauthenticated reset requests have been received from the IP address and the step of comparing the time the request to reset login information was received to the preset amount of time.

10. The system of claim 8, wherein the login information is at least one of a user identifier of the user or a password of the user.

11. The system of claim 9, wherein the step of determining that the IP address associated with the request is not identified as being suspicious further comprises comparing the IP address to a database of IP addresses known to be associated with malicious or aberrant entities.

12. The system of claim 8, further wherein the intrinsic user data of the request is one or more of an IP address, a username, the type of browser used to make the request, an age of the online account, and one or more cookies.

13. The system of claim 8, wherein the step of identifying two or more values of the intrinsic user data further comprises evaluating at least two of a time of the request, a frequency of the request, the type of browser used to make the request, an age of account, one or more cookies, and the device finger print.

14. A non-transitory computer-readable medium storing executable instructions that, when executed by a computer system, cause the computer system to perform a method for managing resetting of online identities or accounts of users, the method including:

receiving, over a network, a request to reset login information to access an online account of a user;

comparing, at an online account server, a time of the request to reset login information to a preset time or amount of time;

receiving, over the network, intrinsic user data associated with the request to reset login information, wherein the intrinsic user data includes a device finger print and a type of browser used to make the request, and wherein the intrinsic user data includes values with different weights indicative of a level of trust of the identity of the user;

identifying, at the online account server, two or more values of the intrinsic user data; and transmitting, over the network, a subset of options to reset the login information, wherein the subset of options to reset the login information is selected by the online account server based on the identified two or more values of the intrinsic user data, and wherein a full set of reset options are transmitted when the online account server determines that the identified two or more values result in a trusted pair.

15. The computer-readable medium of claim 14, further comprising:
   determining whether one or more unauthenticated reset requests have been received from an IP address associated with the request; and
   determining whether the IP address associated with the request is not identified as being suspicious based on the step of determining whether one or more unauthenticated reset requests have been received from the IP address and the step of comparing the time the request to reset login information was received to the preset amount of time.

16. The computer-readable medium of claim 14, wherein the login information is at least one of a user identifier of the user or a password of the user.

17. The computer-readable medium of claim 15, wherein the step of determining that the IP address associated with the request is not identified as being suspicious further comprises comparing the IP address to a database of IP addresses known to be associated with malicious or aberrant entities.

18. The computer-readable medium of claim 14, further wherein the intrinsic user data of the request is one or more of an IP address, a username, the type of browser used to make the request, an age of the online account, and one or more cookies.

19. The computer-readable medium of claim 14, wherein the step of identifying two or more values of the intrinsic user data further comprises evaluating at least two of a time of the request, a frequency of the request, the type of browser used to make the request, an age of account, one or more cookies, and the device finger print.

20. The computer-readable medium of claim 14, wherein the step of identifying two or more values of the intrinsic user data comprises evaluating a presence or absence of data of a screen name or related screen name of the user.

* * * * *